(12) United States Patent
Decegama (10) Patent No.: US 10,313,704 B2
(45) Date of Patent: Jun. 4, 2019

(54) MULTILEVEL VIDEO COMPRESSION, DECOMPRESSION, AND DISPLAY FOR 4K AND 8K APPLICATIONS

(71) Applicant: YAMZZ IP BV, Roosendaal (NL)

(72) Inventor: Angel Decegama, Westford, MA (US)

(73) Assignee: YAMZZ IP BV, Roosendaal (NL)

( * ) Notice: Subject to any disclaimer, the term of this patent is extended or adjusted under 35 U.S.C. 154(b) by 21 days.

(21) Appl. No.: 15/325,066

(22) PCT Filed: Jul. 13, 2015

(86) PCT No.: PCT/US2015/040108
§ 371 (c)(1),
(2) Date: Jan. 9, 2017

(87) PCT Pub. No.: WO2016/010880
PCT Pub. Date: Jan. 21, 2016

(65) Prior Publication Data
US 2017/0164009 A1    Jun. 8, 2017

Related U.S. Application Data

(60) Provisional application No. 62/025,365, filed on Jul. 16, 2014, provisional application No. 62/097,255, (Continued)

(51) Int. Cl.
*H04N 19/85* (2014.01)
*H04N 19/61* (2014.01)
(Continued)

(52) U.S. Cl.
CPC .......... *H04N 19/85* (2014.11); *G06F 17/145* (2013.01); *H04N 7/12* (2013.01); *H04N 19/587* (2014.11); *H04N 19/61* (2014.11); *H04N 19/82* (2014.11)

(58) Field of Classification Search
CPC ........ H04N 19/63; H04N 19/59; H04N 19/85; H04N 19/587; H04N 19/61; H04N 19/82; H04N 7/12; G06F 17/145
See application file for complete search history.

(56) References Cited

U.S. PATENT DOCUMENTS

2004/0218825 A1\* 11/2004 Graffagnino ........... H04N 19/63
382/240
2010/0014590 A1\* 1/2010 Smith .................. H04N 19/176
375/240.19
(Continued)

OTHER PUBLICATIONS

International Search Report, International application No. PCT/US15/40108, dated Oct. 23, 2015.

*Primary Examiner* — Edward Park
*Assistant Examiner* — Michael J Vanchy, Jr.
(74) *Attorney, Agent, or Firm* — Ferguson Case Orr Paterson LLP (57) ABSTRACT

Embodiments of this invention include computer-implemented methods for use of Haar wavelet transforms (HWT) to pre-process video frames that can then be compressed using a codec to produce a compressed video frame. A compressed video frame can then be transmitted, decompressed, post-processed and displayed in their original size and quality, thereby producing real-time high-quality reproduction of video sequences. Devices can implement methods of this invention and include mainframe computers, desktop computers, personal computers, laptop computers, tablet computers, wireless computers, television sets, set top boxes, cellular telephones, and computer readable media. Computer implemented steps can be easily and efficiently implemented in multicore parallel hardware architectures.

7 Claims, 4 Drawing Sheets

Related U.S. Application Data filed on Dec. 29, 2014, provisional application No. 62/150,436, filed on Apr. 21, 2015.

(51) Int. Cl.
| | | |
|---|---|---|
| *H04N 7/12* | (2006.01) | |
| *H04N 19/587* | (2014.01) | |
| *H04N 19/82* | (2014.01) | |
| *G06F 17/14* | (2006.01) | |

(56) References Cited

U.S. PATENT DOCUMENTS

| | | | |
|---|---|---|---|
| 2010/0166327 A1* | 7/2010 | Goel | H04N 19/105 |
| | | | 382/236 |
| 2010/0172419 A1* | 7/2010 | DeCegama | H04N 19/647 |
| | | | 375/240.19 |
| 2011/0069138 A1 | 3/2011 | Ali et al. | |
| 2012/0121022 A1 | 5/2012 | Decegama | |
| 2012/0206468 A1* | 8/2012 | Bratt | G06T 13/80 |
| | | | 345/547 |
| 2013/0156114 A1 | 6/2013 | Azadegan | |
| 2013/0315317 A1 | 11/2013 | Decegama | |

* cited by examiner

MULTILEVEL VIDEO COMPRESSION, DECOMPRESSION, AND DISPLAY FOR 4K AND 8K APPLICATIONS

PRIORITY CLAIM

This International application claims priority to U.S. Provisional Patent Application Nos. 62/025,365 filed 16 Jul. 2014, 62/097,255 filed 29 Dec. 2014, and 62/150,436 filed Apr. 21, 2015, each entitled "Multilevel Video Compression, Decompression and Display for 4K and 8K applications, Angel DeCegama, Inventor. Each of these applications is incorporated herein fully by reference as if separately so incorporated.

COPYRIGHT NOTICE

This application contains material that is subject to protection under copyright laws of the United States (18 U.S.C.) and other countries.

FIELD OF THE INVENTION

This application relates to video compression, transmission, decompression and display. Particularly, this invention relates to new devices and methods for pre-processing and post-processing video information. More particularly, this invention relates to devices incorporating computer implemented compression and decompression using Haar Wavelet-based methods.

BACKGROUND

Video communications systems are being swamped by increasing amounts of data, and current video compression techniques are barely able to keep up with the increasing demands of computers, cable systems, mobile devices, and televisions. Throughout the World, there is rapidly increasing video data traffic over wired and wireless communications networks that is exhausting their physical capabilities with the corresponding decline in the quality of service for millions of users especially now with the introduction of 4K and 8K UHD multimedia content.

A current, yet temporary solution is to provide massive investment in infrastructure, including widespread cable networks to serve cities and rural areas. However, such systems require extensive infrastructure, investment and time. Therefore cable providers may, for business reasons, be reluctant to invest huge sums of money in installing cable infrastructure. Another current solution is to install fiber optic systems for distribution of video content. Although fiber optic systems may increase amount information compared to cable systems, fiber optic systems suffer from similar problems of requiring extensive installation, repair, and servicing. Fiber providers may, for similar business reasons to those of cable providers, be reluctant to invests the huge sums of money required to serve rural or sparsely populated areas.

Additionally, although cable and fiber systems can improve efficiency, the cost of storing, transmitting and displaying video information is quite high. Therefore other current systems involve use of codecs to compress video and other information prior to transmission. Numerous such codecs are in current use.

SUMMARY

Although there have been improvements in speed and capacity of cable and fiber systems, both of those systems are limited by the level of compression of data that is fed through them. As more and more types of video information are being created by content providers, there is an urgent need to provide alternatives to conventional processing, transmission, and display of video content. These problems are increased multifold by the proliferation, world-wide of relatively inexpensive mobile devices, including mobile phones, laptop computers, iPads®, desktop computers and the like. Mobile devices present a particularly difficult problem for conventional cable or fiber systems, and with the world-wide proliferation of wireless communications, there is an urgent need for alternatives.

New solutions based on advanced technology are presented here that allow the communications infrastructure existing at any given time to provide high quality of service far into the future. These solutions comprise mathematical descriptions of methods that improve the video compression capability of any codec by several times without degradation of the video quality produced by the codec by itself alone.

4K/8K UHD Content

The solutions presented herein also solve problems of generating content beyond the 1080p resolution of High Definition (HD) for the new 4K Ultra High Definition (UHD) TV sets that are beginning to appear. Such 4K TV sets normally use the 1080p content of existing Blu-ray disks that is input to the TV, which has the internal circuitry to "upscale" (double the resolution) of such input to 4K. Depending on the quality of the 4K TV, such upscaling uses simple techniques such as pixel replication and mathematical interpolation with the corresponding loss of visual quality with respect to true 4K resolution.

New approaches presented herein address this quality problem for interested individuals and organizations. Even though there is practically no demand for 8K content at the present time, solutions presented herein can create 8K content from 4K content with the same demonstrated mathematical precision, pixel by pixel.

Compression of 4K Content for Internet Delivery

It has been indicated by Netflix that the streaming of 4K content will require at least 15 Mpbs. Solutions presented herein can provide 4K content for less than 2 Mbps (actually about 1.5 Mbps in most cases. Using methods and devices presented herein, 1080p resolution can be delivered at 1 Mbps and smart phone video of high quality can be delivered at 0.15 Mbps.

Applications

There are many types of applications of the new technology. They include:

1. 4K TV Manufacturers, where software implementation can be carried out using internal hardware (such as the Netflix player in some 4K TV models);
2. 4K Laptop Manufacturers, including Toshiba, Lenovo, etc. where fast and efficient processing is desirable using a fast and efficient computer implemented method;
3. Set Top Box Manufacturers implementing the new methods and devices:
   a. Between a Blu-ray player and 4K TV reducing cost of the TV, and
   b. Between cable company box and 4K TV;

4. Dongle Manufacturers can drive 4K TV to display wirelessly and receive highly compressed video from anywhere;

5. Content Providers can drastically cut the costs of video delivery for 4K display as well as for any other resolution, including Netflix, etc.

6. Manufacturers of chips for cable boxes and video streaming devices for 60 fps producing significant cost reduction, such as STMicroelectronics, etc.

7. Content Creators can immediately use 1080p resolution to control cost for 4K content delivery to viewers;

8. Video Communications for secure personal and organizational uses;

9. Government applications; and 10. 8K applications.

Aspects of this invention address the problem of rapidly increasing video data traffic over wired and wireless communications networks that is exhausting their physical capabilities with the corresponding decline in the quality for service. With the introduction of 4K and 8K Ultra-High Definition ("UHD") multimedia content, the temporary solutions currently available have been to making massive infrastructure investments in cable, fiber optic and other similar technologies. Unfortunately, such investment is very costly and disruptive to persons living in the area of the construction sites. Such infrastructure developments are not relevant to those persons who do not have access to fixed cable or fiber providers.

Recently, I have disclosed certain computer-implemented methods using Haar Wavelet Transform. Those disclosures can be found in U.S. Pat. Nos. 8,031,782, 8,503,543, PCT Application No. PCT/US2009/04879, U.S. Patent Application No. 61/190,585, and U.S. patent application Ser. No. 13/958,945. The contents of each of these patents and patent applications are herein incorporated fully by reference.

I have now taken a completely new approach to solving the problem. The new solutions are based on the application of novel computer-implemented processing steps based on new mathematical principles. These solutions improve the video compression capability of any codec by several times without degradation of the video quality produced by the codec by itself alone. The processing involved comprises preparation of a video frame of the original video file before passing them on to a given codec. The codec then processes the received frame in its usual way to produce a much smaller compressed video file than without the initial processing. The compressed video file can then be stored and/or transmitted. For decompression and playback, the codec decompresses the compressed video frame in its usual way and then passes it on to a post-processor device that recreates a video file than when displayed, has a very high quality that is indistinguishable from that produced by the codec alone without using the pre- and post-processing steps, but at a much higher bit rate.

BRIEF DESCRIPTION OF THE FIGURES

This invention is described with reference to specific embodiments thereof. Other features of this invention can be appreciated with reference to the Figures, in which:

FIGS. 1A-1C depict video pre-processing according to one embodiment.

FIGS. 2A-2C depict video post-processing according to an embodiment in which a single level of pre-processing and post-processing occurs.

FIGS. 3A-3E depict video post-processing according to an embodiment in which two levels of resolution (compression and decompression) occurs.

DETAILED DESCRIPTION

Definitions

As used herein, the term "algorithm" means a mathematical description of operational steps implemented in a computer that has been specially programmed to carry out and implement the steps.

The term "a" and "an" mean one or more.

The term "comprising" means "includes but is not limited to."

The term "consisting of" means "includes and is limited to."

The term "consisting essentially of" means "includes the literal element and equivalents thereof."

The term "special purpose computer" means a computer device programmed to carry out and implement technical steps including pre-processing, compression, transmission, decompression, and transmission according to Wavelet Transform. A special purpose computer may also contain one of a number of current video codecs.

The term "HD" means high definition.

The term "HWT" means Haar Wavelet transform.

The term "UHD" means ultra high definition.

The term "WT" means wavelet transform

The term "IHWT" means "Inverse Haar Wavelet Transform."

The term "transformation" means the creation of an output image or portion thereof based on an input.

The term "pre-processor" means a computer module specifically programmed to carry out initial steps of the process according to HWT, and includes programmed instructions to compress a video frame using HWT.

As used herein, the terms "frame pre-processing," "frame size preprocessing" and "frame size reduction" mean processes where a video image or video frame is reduced in size in accordance with aspects of this invention using HWT. A frame so produced is also known as a "reduced-frame."

The term "post-processor" means a computer module specifically programmed to carry out decompression of a transmitted video representation using Inverse HWT.

As used herein, the terms "frame post-processing," "frame size post-processing" and "frame expansion" mean processes whereby an image is expanded according to methods of this invention using IHWT to produce a high-quality image. Such a frame can also be called an "expanded frame." It is to be understood that "expanded frame" can mean an image that has been expanded without any "pre-processing," coded compression, and codec decompression.

As used herein the term "video image" has the same meaning as "video frame," and the term "image" has the same meaning as "frame" when used in the context of video information.

The term "codec" refers to a computerized method for coding and decoding information, and as applied to this invention, refers to a large number of different codec technologies, including MPEG-4, H-264, VC-1, as well as wavelet-based methods for video compression/decompression disclosed in U.S. Pat. No. 7,317,840, the contents of which are herein incorporated fully by reference.

The term "physical computer readable medium" or "physical medium" as applied to a storage device includes diskettes, compact disks (CDs) magnetic tape, paper, flash drive, punch cards or other physical embodiments containing instructions thereon that can be retrieved by a computer device and implemented using a special purpose computer programmed to operate according to methods of this invention.

A "non-physical computer readable medium" or "non-physical medium" means signals which can be received electronically by a computer system and stored and implemented by a computer processor.

Pre-Processing

Pre-processing methods of this invention can result in a size reduction for the frame of ¼ for one level of transformation or ¹⁄₁₆ for two levels of transformation, and so on. This can be done for all frames in a given video sequence. Then the reduced frames are used to create a new video file, for example, in .avi format. It can be appreciated that other file formats can also be used, including for example, OG3, Asf, Quick Time, Real Media, Matroska, DIVX and MP4. This file is then input to any available codec of choice and it is compressed by the codec following its standard procedure to a size which typically ranges from 20% (one level of WT) to less than 10% (two levels or more of WT) of the compressed size obtained without the step of frame size reduction. Such files can be stored and/or transmitted with very significant cost savings. By appropriately interfacing with the codec, such procedures can be carried out frame by frame instead of having to create an intermediate file.

Figure 1A:
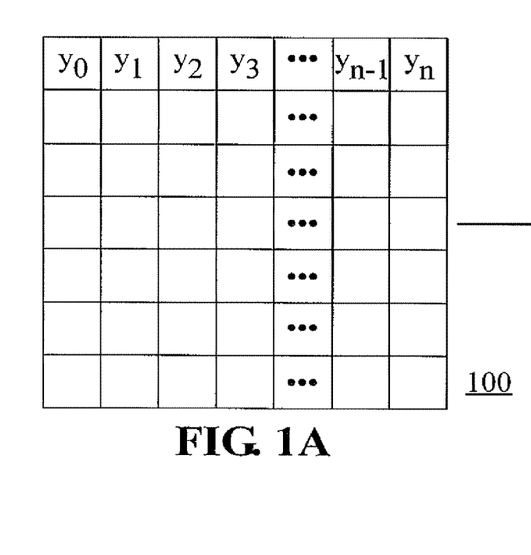
FIG. 1A depicts an original frame 100 shown on the top has columns and rows of pixels, some of which are labeled. Wavelet transformation is applied as shown in FIG. 1B.
Figure 1B:
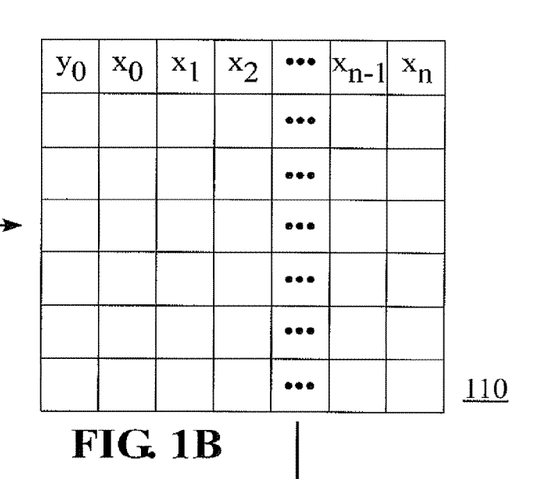
FIG. 1B depicts an embodiment in which horizontal wavelet transformation 110 is carried out. Wavelet transformation is applied as shown in FIG. 1C.
Figure 1C:
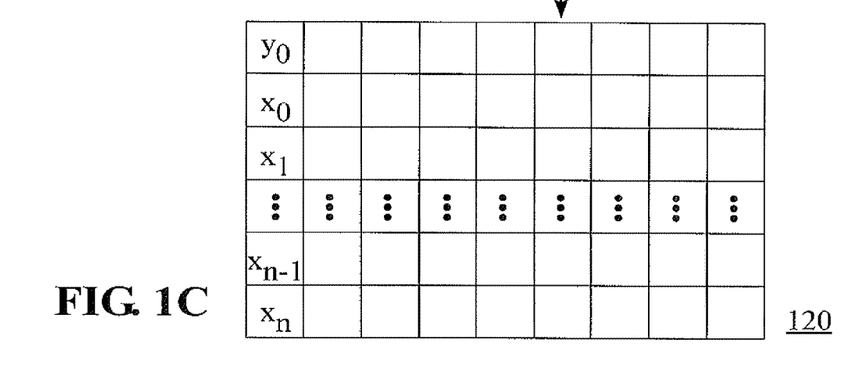
FIG. 1C depicts an embodiment in which vertical wavelet transformation 120 is carried out.

FIG. 1 depicts video pre-processing according to an embodiment. FIG. 1A depicts an original frame 100 shown on the top has columns and rows of pixels, some of which are labeled: $y_0, y_1, y_2 \ldots y_{n-1}$, and $y_n$. Haar wavelet transformation is applied as shown in FIG. 1B, in which horizontal wavelet transformation 110 is carried out. Some pixels are labeled: $y_0, x_0, x_1, x_2 \ldots x_{n-1}$, and $x_n$. Haar wavelet transformation is applied as shown in FIG. 1C, in which vertical wavelet transformation 120 is carried out. Some pixels are labeled: $y_0, x_0, x_1 \ldots x_{n-1}$, and $x_n$.

Post-Processing

For decompression of each frame, the codec is used in its normal way and a file (for example, in .avi format) of a size approximately equal to ¼ (one level of WT) or ¹⁄₁₆, ¹⁄₆₄, etc. (two levels or more of WT) of the original uncompressed file size is obtained. The final step is to generate a file where all the frames are full size with the file size being the same as that of the original uncompressed file. The methods and systems to accomplish that without loss of quality with respect to the decompressed frames produced by the codec without the initial frame size reduction are described herein. This step can be accomplished frame by frame without producing the intermediate file, further improving the efficiency of the process.

Figure 2A:
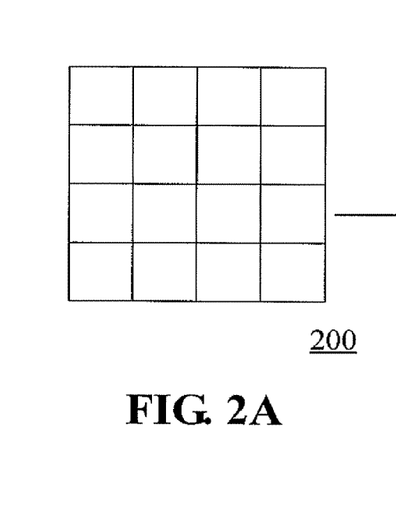
FIG. 2A depicts the output 200 of a video decoder (pFrame In).
Figure 2B:
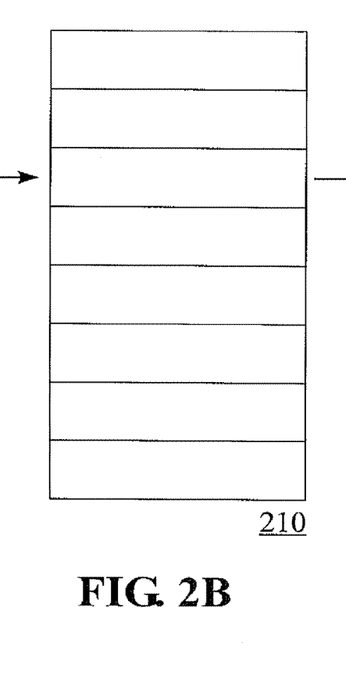
FIG. 2B depicts a video frame 210 that has been decompressed by rows using Inverse Wavelet Transformation ("IWT") (Img).
Figure 2C:
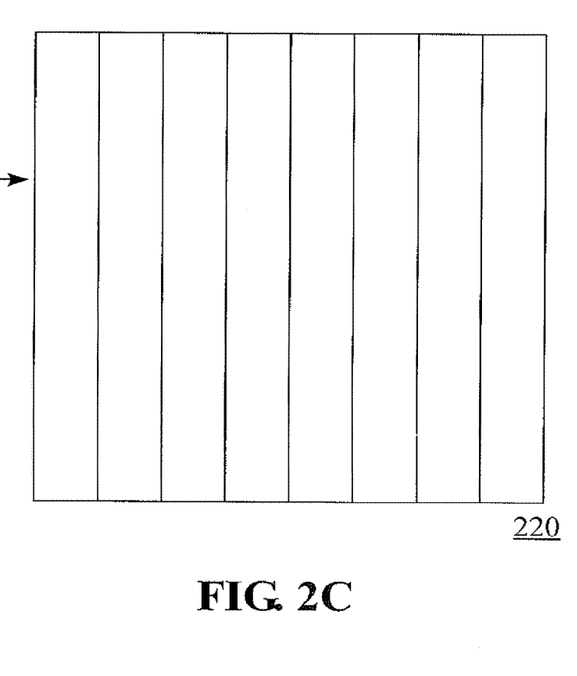
FIG. 2C depicts the video frame 220 decompressed by columns (pFrame Out).
Figure 3A:
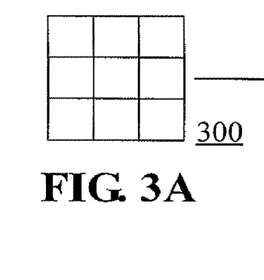
FIG. 3A depicts output 300 of a video decoder (pFrame In).
Figure 3B:
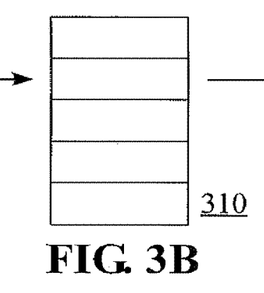
FIG. 3B depicts a first level of Inverse Wavelet Transform (IWT) 310 by rows (Img).
Figure 3C:
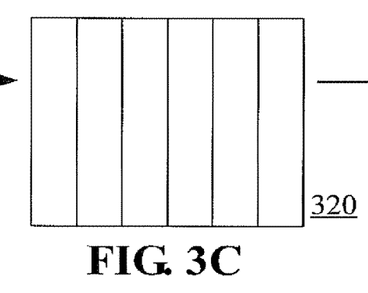
FIG. 3C depicts a first level IWT 320 by columns (Frame Out).
Figure 3D:
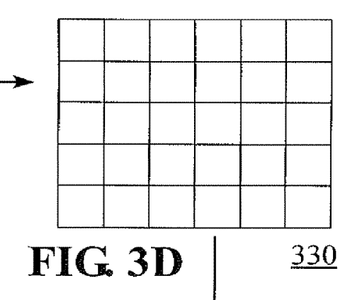
FIG. 3D depicts completed first level IWT and input into a second level IWT 330. (Frame In=Frame Out).
Figure 3E:
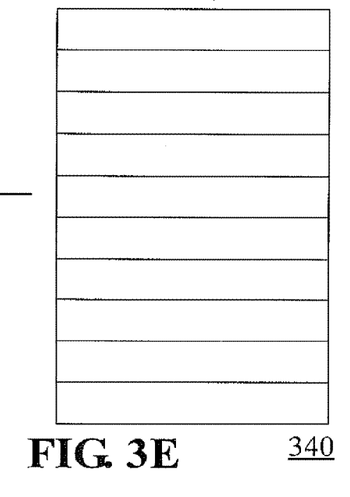
FIG. 3E depicts a second level IWT 340 by rows (Img).
Figure 3F:
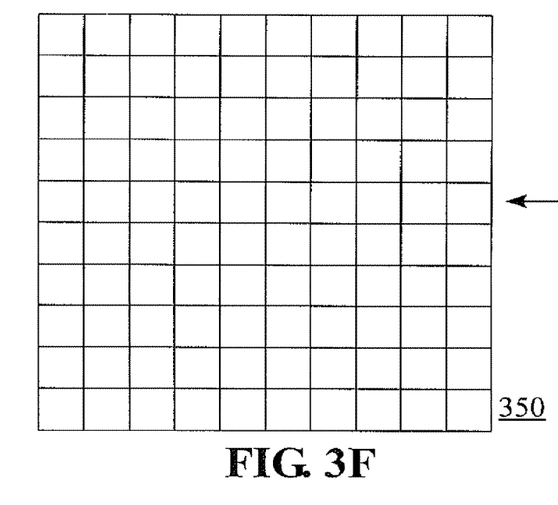
FIG. 3F depicts a second level IWT 350 by columns (pFrame Out), resulting in a two-level resolution.

FIG. 2 depicts video post-processing according to an embodiment in which a single level of pre-processing and post-processing occurs. FIG. 2A depicts the output 200 of a video decoder (pFrame In). FIG. 2B depicts a video frame 210 that has been decompressed by rows using Inverse Haar Wavelet Transformation ("IHWT") (Img), and FIG. 2C depicts the video frame 220 decompressed by columns (pFrame Out).

FIG. 3 depicts video post-processing according to an embodiment in which two levels of resolution (compression and decompression) occurs. FIG. 3A depicts output 300 of a video decoder (pFrame In). FIG. 3B depicts a first level of Inverse Wavelet Transform (IWT) 310 by rows (Img). FIG. 3C depicts a first level IWT 320 by columns (Frame Out). FIG. 3D depicts completed first level IWT and input into a second level IWT 330. (Frame In=Frame Out) FIG. 3E depicts a second level IWT 340 by rows (Img), and FIG. 3E depicts a second level IWT 350 by columns (pFrame Out), resulting in a two-level resolution.

It can be appreciated that a series of frames can be pre-processed, compressed, transmitted, decompressed, post-processed and displayed in real time, thereby producing a high quality video, such as a movie or live broadcast. Because the steps in pre-processing, compression, decompression, post-processing can be carried out very rapidly, a reproduced video (e.g., a movie or live broadcast), can be viewed in real time.

It is to be understood that frame expansion can be applied to any input image, whether pre-processed, codec compressed, codec expanded, or otherwise processed to produce high quality video images of sizes larger than the size of the input image.

Description of Aspects

Aspects of this invention are based on the mathematics of the Wavelet Transform (WT). An embodiment of the invention involves taking a decimated WT of a given video frame down in size and content by one or more levels and retaining only the low-frequency parts at each level. Embodiments of this invention include new systems and methods for decreasing the amount of space needed to store electronic files containing video images.

It is to be understood that the aspects and portions thereof described herein can be used in any combination, and as appropriate in any order, without departing from the invention.

In certain embodiments, a frame of a video file is pre-processed by methods and systems of this invention using WT or HWT to reduce its size by factors of 4, 16, 64 or even further. Then a video codec is applied to compress the frame of significantly reduced size further to produce a compressed file which is significantly smaller than the file would be without the use of the frame pre-processing. In some embodiments, all frames of a video file can be processed in a similar fashion to produce a compressed file or series of compressed files. A compressed file can then be stored and/or transmitted before decompression. In post-processing, a processing step can recover one or more individual video frames in their original size or larger with high quality. This is accomplished by another aspect of the invention that can used after a codec decompression step.

Thus, in certain aspects, this invention provides a system or device for video image compression and decompression, comprising:
  a first computer module for image frame pre-processing using direct Wavelet Transformation (WT) or Haar Wavelet Transform (HWT);
  a video codec;
  a second computer module for image frame post-processing using low-frequency parts of the WT or HWT and the first or last pixel of every row and column of the original image before the WT or HWT and
  an output device.

In other aspects, this invention provides a system wherein a first computer module comprises:
  an input buffer for storing a video image frame;
  a memory device storing instructions for frame pre-processing, wherein said instructions are based upon direct WT or HWT;
  a processor for implementing said instructions for frame pre-processing, and
  an output.

In further aspects, this invention includes systems wherein said second computer module comprises:
  an input buffer;
  a memory device storing instructions for frame post-processing, wherein said instructions are based upon using low-frequency parts of the WT or HWT plus the first or last pixel of every row and column of the original image before the WT or HWT;
  a processor for implementing said instructions for frame post-processing; and
  an output.

In still further aspects, this invention provides systems further comprising another storage device for storing a post-processed frame of said video image.

In other aspects, a system of this invention includes instructions for frame pre-processing using decimated WT or HWT and retaining low frequency part of said decimated WT and discarding high-frequency part of the decimated WT or HWT.

In still other aspects, a system of this invention includes instructions for frame post-processing to recreate a post-processed frame by using low-frequency parts of the WT or HWT and the first or last pixel of every row and column of the original image before the WT or HWT and recreating the input image using IWT or IHWT.

In other aspects a system of this invention includes instructions for frame post-processing to recreate a full sized post-processed frame by using low-frequency parts of the WT or HWT and the first or last pixel of every row and column of the original image before the WT or HWT.

In further aspects, this invention provides an integrated computer device for pre-processing a video image frame, comprising:

a computer storage module containing instructions for frame pre-processing according to decimated WT or HWT; and
  a processor for processing said decimated WT or HWT by retaining low-frequency parts and discarding high-frequency parts.

In additional aspects, this invention provides an integrated computer device for post-processing a video image frame, comprising:
  a computer storage module containing instructions for frame post-processing using low-frequency parts of the WT or HWT and the first or last pixel of every row and column of the original image before the WT or HWT; and
  a processor for processing said computations to re-create a full-size video image.

In still further aspects, this invention provides a computer readable medium, comprising:
  a medium; and
  instructions thereon to pre-process a video frame using WT or HWT.

In still additional aspects, this invention provides a computer readable medium, comprising:
  a medium; and
  instructions thereon to post-process a reduced video frame to re-create a video frame of original size using low-frequency parts of the WT or HWT plus the first or last pixel of every row and column of the original image before the WT.

In other aspects, this invention provides a method and device for frame expansion using IHWT without pre-processing.

In still other aspects, this invention provides a method and device for frame expansion using IHWT without pre-processing or codec decompression.

In further aspects, this invention provides a method and device for frame expansion using IHWT without pre-processing, codec compression, or codec decompression.

In certain of these above aspects, a computer readable physical medium is a diskette, compact disk (CD), magnetic tape, paper, or punch card.

In aspects of this invention, the Haar WT is used.

In other aspects of this invention Daubechies—4, Daubechies—6, Daubechies—8, bi-orthogonal or asymmetrical wavelets can be used.

Systems of this invention can provide high-quality reproduction of video images in real time. In some aspects, systems can provide over 50% reduction in storage space. In other aspects, systems can provide over 50% reduction in transmission cost, with little perceptible loss of visual quality. In other aspects, systems of this invention can provide 70% to 80% reduction in storage costs. In additional aspects, systems of this invention can provide 70% to 80% decrease in transmission costs, with little or no perceptible loss of visual quality compared to codec alone compression, transmission and decompression.

In other aspects, this invention provides a method for producing a video image of an object, comprising the steps:
  a. providing a digitized image frame of said object;
  b. providing a decimated WT or HWT of said digitized image frame;
  c. discarding high-frequency components of said decimated WT thereby producing a pre-processed frame;
  d. compressing said pre-processed frame using a video codec producing a compressed video frame;
  e. decompressing said compressed video frame using said codec; and f. recreating a full sized image of said frame using post-processing using low-frequency parts of the WT or HWT and the last pixel of every row and column of the original image before the WT or HWT.

In other aspects, a method of this invention provides after step d above, a step of transmitting said compressed image to a remote location.

In still other aspects, this invention provides a method, further comprising displaying said full sized image on a video monitor.

In certain of these aspects, this invention provides a method, further comprising a second level pre-processing step.

In other of these aspects, this invention provides a method, further comprising a second level step and a third level step of pre-processing.

In other of these aspects, this invention includes a method, further comprising a second level step and a third level step of frame size expansion.

In certain embodiments, this invention includes a method, wherein a codec is selected from the group consisting of MPEG-4, H264, VC-1, H265, and DivX.

In other embodiments, this invention includes a method, wherein said codec is a wavelet-based codec or any other kind of codec.

In certain aspects, methods of this invention can provide high-quality video reproduction of video images in real time. In some aspects, methods can provide over 50% reduction in storage space. In other aspects, methods can provide over 50% reduction in transmission cost, with little perceptible loss of visual quality. In other aspects, the reduction in storage space may be over 70% to 80%, with little reduction in video quality compared to codec-alone compression, transmission and decompression.

Certain aspects include a computer device for pre-processing a video image frame, comprising:
  an input;
  a computer storage module containing instructions for frame pre-processing of a video frame received by said input according to decimated Haar WT;
  a processor for processing said decimated WT by retaining low-frequency parts and discarding high-frequency parts; and
  an output; said instructions for pre-processing includes the following steps:
    i. For all rows i, store a first pixel in a first element of original frame $W_0(i,0)$ and compute all low frequency values of HWT and store them in frames $W_0(i, j)$; and
    ii. for all columns j of each frame $W_0(i, j)$, store first pixel in first element of frame $W(0, j)$ and compute all low frequency values of HWT and store them in frames $W(i, j)$.

Additional aspects include a computer device for post-processing a video image frame, comprising:
  an input;
  a computer storage module containing instructions for frame post-processing using low-frequency parts of a Haar WT using the following steps:
    a processor programmed to carry out the following steps;
    i. for all rows i of frame $W_x(i, j)$, copy the first row to $F_0(0, j)=W_x(0, j)$;
    ii. for all columns j, compute the next row $F_0(1, j)=2*W_x(1, j)-F_0(0, j)$;
    iii. for all columns j, compute the next row $F_0(2, j)=(2*W_x(2, j)+F_0(1, j))/3$;
    iv. for all columns j, compute the next row $F_0(3, j)=2*W_x(2, j)-F_0(2, j)$;
    v. for all columns j, compute subsequent rows similarly;
    vi. copy the first column of $F_0(i,j)$ to $F(i,0)$, $F(i,0)=F_0(i,0)$
    vii. for all rows i of $F_0(i,j)$, compute the next columns $F(i,1)=2F_0(i,1)-F(i,0)$;

$F(i,2)=(2F_0(i,2)+F(i,1))/3$;

$F(i,3)=2F_0(i,2)-F(i,2)$;

viii. for all columns j>3, compute subsequent columns similarly; and
    ix. store the calculated pixels.

Other aspects include a system for video image compression and decompression, comprising:
  a first computer module for image frame pre-processing of a previous aspect;
  a video codec;
  a second computer module for image frame post-processing of a previous aspect; and
  an output device;
said first computer module, or said second computer module is a programmable processing apparatus selected from the group consisting of mainframe computers, desktop computers, personal computers, laptop computers, tablet computers, wireless computers, and cellular telephones.

Additional aspects include a computer readable medium, comprising:
  a physical medium; and
  instructions thereon to pre-process a video frame according to a previous aspect.

Still additional aspects include a computer readable medium, comprising:
  a physical medium; and
  instructions thereon to post-process a reduced video frame according to a previous aspect.

Yet further aspects include a computer readable medium of a previous aspect, said medium selected from the group consisting of diskettes, compact disks (CDs), magnetic tape, paper, flash drive, punch cards, magnetic disks, removable flash memory devices, and computer processor storage buffers.

Additionally, aspects include a system of a previous aspect, said post-processor module further comprising two filters, to select from the group consisting of Y, U, V, R, G, or B.

Further aspects include a method for producing a video image of an object, comprising the steps:
  a. providing a digitized image frame of said object and storing said digitized image frame in a memory device of a computer processor;
  b. providing a decimated Haar wavelet transform (WT) of said digitized image frame;
  c. discarding high-frequency components of said decimated WT thereby producing a pre-processed frame according to the following steps;
    i. For all rows i, store a first pixel in first element of original frame $W_0(i, 0)$ and compute all low frequency values of HWT and store them in frames $W_0(i, j)$
    ii. for all columns j of each frame $W_0(i, j)$, store a first pixel in first element of frame $W(0, j)$ and compute all low frequency values of HWT and store them in frames $W(i, j)$
  d. pass each frame $W(i, j)$ to the video codec e. compress said pre-processed frame using a video codec thereby producing a compressed video frame;
f. decompress said compressed video frame using said codec; and
g. recreate a full sized image of said frame using post-processing using low-frequency parts of the WT and the last pixel of every row and column of the original image before the WT by carrying out the following steps;
   i. for all rows i of frame $W_x(i, j)$, copy the first row to $F_0(0, j)=W_x(0, j)$;
   ii. for all columns j, compute the next row $F_0(1, j)=2*W_x(1, j)-F_0(0, j)$;
   iii. for all columns j, compute the next row $F_0(2, j)=(2*W_x(2, j)+F_0(1, j))/3$;
   iv. for all columns j, compute the next row $F_0(3, j)=2*W_x(2, j)-F_0(2, j)$;
   v. for all columns j, compute subsequent rows similarly;
   vi. copy the first column of $F_0(i,j)$ to $F(i,0)$, $F(i,0)=F_0(i,0)$
   vii. for all rows i of $F_0(i,j)$, compute the next columns $$F(i,1)=2F_0(i,1)-F(i,0);$$

$$F(i,2)=(2F_0(i,2)+F(i,1))/3;$$

$$F(i,3)=2F_0(i,2)-F(i,2);$$

viii. for all columns j>3, compute subsequent columns similarly; and
h. display frame F(i, j).

Yet additional aspects include a method of a previous aspect, comprising a single level frame size reduction.

Additional aspects include a method of a previous aspect, further comprising a second level of frame size reduction.

Yet additional aspects include a method of a previous aspect, further comprising a third level of frame size reduction.

Yet additional aspects include a method of a previous aspect, comprising a single level frame size expansion.

Still additional aspects include a method of a previous aspect, further comprising a second level frame size expansion.

Still further aspects include a method of a previous aspect, further comprising a third level frame size expansion.

Additional aspects include a system as herein described.

Yet further aspects include a method as herein described.

There are a multitude of applications for video compression in areas such as security, distant learning, videoconferencing, entertainment, and telemedicine.

Description of Embodiments

The descriptions and examples that follow are intended to illustrate aspects of this invention, and are not intended to limit the scope of the invention. Persons of skill in the art can use the disclosures and teachings herein to create other embodiments. In an embodiment, the general description includes programming according to the flow charts, or pseudocode, or the source code disclosed herein. Thus, such embodiments represent only certain specific embodiments for carrying out the invention. More generally, the mathematical descriptions disclosed herein represent numerous bases for achieving substantially the same function in substantially the same ways of carrying out the invention to achieve substantially the same result. Additional ways of implementing the mathematical formulae other than the described flow charts, or the described pseudocode, or the described source code are each considered equivalent ways of carrying out the invention. Each of those embodiments and their equivalents are considered to be part of this invention.

General Description of an Embodiment

I have developed OpenCL/GPU computer assisted applications and implementations of the mathematical methods. High level details of the programmed steps of an example of such an implementation are as follows:

A. Video Pre-Processing

1. Reduce frame size horizontally:
For every row save the first pixel $y_0$ and the low frequency HWT of all the pixels.

2. Reduce frame size vertically:
For every column of the resulting elongated frame, save the first pixel $y_0$ and the low frequency HWT of all the pixels.

These steps can be repeated for more levels of reduction but one level is suitable for many uses. It can be appreciated that the above two steps of Pre-Processing can be carried out in any order.

B. Video Post-Processing

1. Obtain the intermediate low frequency HWT components of the codec decompressed frames as indicated in the Different Versions of Methods section for the desired frame rate.

2. Increase frame size vertically:
For every row of the frames obtained in Step 1 compute the pixels of the next two rows of the higher resolution frame by applying the formulas of the described methods, i.e., for example, from $y_1$ we obtain $y_2$ and $y_3$ with $y_2=((2x_1+y_1)/3)$ and $y_3=2x_1-y_2$, where $y_1$, $y_2$ and $y_3$ correspond to the pixels of each column moving along the three rows. All such rows can be computed simultaneously in parallel in any modern heterogeneous architecture involving a host CPU and a multi-parallel GPU video card such as NVIDIA GTX980 card which can be programmed using OpenCL/CUDA.

3. Increase frame size horizontally:
For every row of the resulting elongated higher resolution frame compute the pixels of the two columns of the higher resolution frame following a previously calculated pixel. For example, from $y_1$ we obtain $y_2=((2x_1+y_1)/3)$ and $y_3=2x_1-y_2$, from $y_2$ we obtain $y_4=((2x_2+y_3)/3)$ and $y_5=2x_2-y_4$ and so on, moving along the pixels of each row. All the rows can be done simultaneously in parallel in a hardware architecture with a host CPU and a GPU consisting of a multi-parallel video graphics card using, as in step 2, OpenCL/CUDA programming.

It can be appreciated that the above two steps of Post-Processing can be carried out in any order.

Multilevel Video Compression, Decompression with Applications to HD and UHD

The mathematical principles or ways behind the methods presented herein are those of the Wavelet Transform (WT) or Haar Wavelet Transform (HWT). This is important because it has been demonstrated that human beings use the basic concepts of the WT to process in their brains all sensory information specially visual information that requires enormous amounts of compression. Such compression involves the discarding of all data that is irrelevant from the standpoint of human perception.

Such new methods for video data pre- and post-processing to be used with any given video codec without modifying the codec in any way are the basis for the extraordinary typical results shown in the following Table 1 for HD and UHD video.

TABLE 1

Improvement of Video Codec Compression Capabilities
(Without loss of video quality for any given codec)
Typical Results for MPEG-4, H-264, VC-1

| Video | HD 1080 p Bitrate | 4 K UDH Bitrate |
|---|---|---|
| Movies | 1 Mbps | 1.5 Mbps |
| Nature | 1 Mbps | 1.5 Mbps |
| Sports | 1.1 Mbps | 1.75 Mbps |

These results indicate that this technology can substantially reduce the current costs of storage and transmission of high quality video including High Definition and Ultra High Definition video. Also, the existing infrastructure can be used to significantly increase the number of paying customers without degradation of the quality of service.

Figure 4:
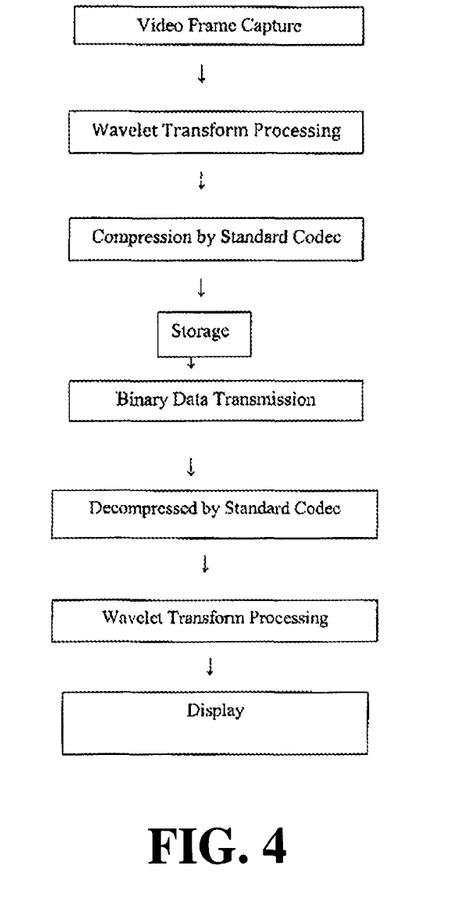
FIG. 4 is a flow chart showing a process of incorporating Pre-Processing and Post-Processing modules into an existing process.

These significant business improvement results can be achieved with no disturbance to the codecs currently used by any organization. All that is required is the insertion of Pre-Processing and Post-Processing modules of this technology in the existing processing sequence as shown FIG. 4.

Descriptions of Programmable
Computer-Implemented Methods

The descriptions below represent ways of using Haar Wavelet Transform (HWT) to achieve improved pre-processing and post-processing. Video frames of the original uncompressed video are pre-processed before passing them on to whatever video codec is used for additional video compression. Pre-processing consists of taking the low frequency components for the HWT of each video frame first horizontally by rows and then vertically by columns of the pixels of the frame (FIGS. 1A-1C). Alternatively, one can take the low frequency components for the HWT of each video frame first vertically by columns and then horizontally by rows of the pixels of the frame The given video codec then compresses, frame by frame, the video made up of the pre-processed frames for storage or transmission and then it decompresses such frames that are now very close to the pre-processed frames before the codec. The methods then post processes the received frames from the decoder and produces frames for display that are visually indistinguishable from the original video frames (FIGS. 2A-2C and 3A-3E).

Taking a specific row or column before final post processing prior to display of the video frames, it has the following structure.

$$x_0, x_1, x_2, x_3, \ldots x_n,$$

where $$x_0 = \frac{y_0 + y_1}{2},$$

$$x_1 = \frac{y_2 + y_3}{2},$$

$$x_2 = \frac{y_4 + y_5}{2},$$

$$\vdots$$

$$x_n = \frac{y_{2n} + y_{2n+1}}{2},$$

where the $y_i$s represent pixel values.

The goal of post-processing is to recover the original pixels $y_0, y_1, y_2, y_3, \ldots y_{2n}, y_{2n+1}$ From the x values. If we had the high frequency components of the HWT, such pixels could be recovered exactly. This method does precisely that. In the first place we have:

$$y_1 = 2x_0 - y_0$$

and $$x_1 = (y_2 + y_3)/2$$

which defines the low frequency HWT component $$H_1 = y_2 - y_3)/2$$

which defines the high frequency HWT component. Then, $$y_2 + y_3 = 2x_1$$

and $$y_2 - y_3 = 2H_1$$

Adding these two equations, we get:

$$2y_2 = 2x_1 + 2H_1$$

Subtracting them, we get:

$$2y_3 = 2x_1 - 2H_1$$

In order to find $H_1$, we define first an approximation of $y_2$, which is $$(y_2)' = x_1 + \frac{y_1 - (y_2)'}{2}$$

Instead of the exact inverse WT, which is:

$$y_2 = x_1 + H_1 = x_1 + \frac{y_2 - y_3}{2},$$

we have the above approximation:

$$(y_2)' = x_1 + \frac{y_1 - (y_2)'}{2},$$

which gives $$3(y_2)' = 2x_1 + y_1.$$

Then $$(y_2)' = \frac{2x_1 + y_1}{3}$$

Since the actual value of $y_2$ is given by $$y_2 = x_1 + \frac{y_2 - y_3}{2},$$

we can obtain $y_2$ from $(y_2)'$ by:

$$y_2 = (y_2)' - \frac{y_1}{2} + y_2 - \frac{y_3}{2}$$
$$= (y_2)' - \frac{y_1}{2} + y_2 - \frac{2x_1 - y_2}{2}$$
$$= (y_2)' - \frac{y_1}{2} + \frac{3y_2 - 2x_1}{2}, \text{ which gives}$$

$$2y_2 = 2(y_2)' - y_1 + 3y_2 - 2x_1$$

and $$y_2 = 2x_1 + y_1 - 2(y_2)' = 2x_1 + y_1 - \frac{2(2x_1 + y_1)}{3}$$

Simplifying we get $$y_2 = \frac{y_1}{3} + \frac{(2x_1)}{3}$$

and the actual value of $$y_2 = \frac{2x_1 + y_1}{3}$$

which confirms the choice of the initial estimate. Consequently, $$y_3 = 2x_1 - y_2$$

Therefore, given $y_1$, we can calculate the high frequency Haar WT component H1 of $y_2$ and $y_3$ which is obtained from $$y_2 = x_1 + H1$$

and $$y_3 = x_1 - H1$$

where $$H1 = \frac{y_2 - y_3}{2}, \text{ and } x_1 = \frac{y_2 + y_3}{2}$$

Also, $H1 = y_2 - x_1$ which, based on the above result, becomes $$H1 = \frac{2x_1 + y_1}{3} - x_1 = \frac{y_1 - x_1}{3}$$

Therefore, we can obtain the actual pixel values $y_i$'s of any row or column of a given video frame from their low frequency Haar WT values with an efficient method based on preceding pixel values.

If we have $y_1$ described below, then we obtain $$y_2 = (2x_1 + y_1)/3,$$
$$y_3 = 2x_1 - y_2,$$

$$y_4 = \frac{(2x_2 + y_3)}{3},$$
$$y_5 = 2x_2 - y_4,$$
$$y_6 = \frac{(2x_3 + y_5)}{3},$$
$$y_7 = 2x_3 - y_6$$
$$\vdots$$

etc.

With respect to $y_1$, it is calculated from $y_0$ the first pixel $y_1 = 2x_0 - y_0$ and the first low-frequency component of the Haar WT of the corresponding row or column. $y_0$ is given because it was saved from the original frame.

Computation of the PSNR values of video frames decompressed with the methods verify the precision of this algorithm. Such PSNR results are presented below.

Different Versions of Methods

The final resolution frames can be calculated as indicated from the first pixel of every row and column and the low frequency Haar WT of every row and column. An additional step can be done in order to obtain different values for the number of frames per second (fps).

If the fps of the original input video is acceptable, no additional steps are necessary. If higher fps are desired to enhance the perceived video quality of fast motion videos, then an additional processing step is necessary to generate the corresponding fps.

Such processing step consists of calculating intermediate frames with low frequency HWT components between consecutive given frames.

1. Double Frame Rate:

Given two known consecutive frames with specific $x_i$'s in the same frame location, e.g., $x_1$ and $x_2$, the low frequency HWT component, $y_1$, of the intermediate frame in such frame location can be obtained using the following expression:

$$y_1 = ((x_2 - x_1)/2) + x_1,$$

then applying the described methods for the higher resolution frame of the new intermediate frame HWT values in each row and column.

2. Triple Frame Rate:

Similarly, one can add two more intermediate frames between two consecutive frames with specific $x_i$'s in each frame location, given for example the original $x_1$ and $x_2$ values of the specific frame location is obtained using the following expression:

$$y_1 = ((x2 - x_1)/3) + x_1$$

and $$y_2 = x_2 - ((x_2 - x_1)/3)$$

3. Quadruple Frame Rate:

Similarly, one can add three more frames with $y_i$ values between two consecutive frames with $x_i$ values for example $x_i$ and $x_2$ in a specific frame location is obtained using the following expression:

$$y_1 = ((x_2 - x_1)/4) + x_1, y_2 = ((x_2 - x_1)/2) + x_1, y_3 = x_2 - ((x_2 - x_1)/4)$$

and so on.

This version of the method was extensively tested and its computational efficiency and desirable quality of the post-processed video was verified.

PseudoCode for Video Processing Using Haar Wavelet Transform

A. Pre-Processing

The pseudocode that follows represents an example of application of a mathematical way of pre-processing video.

```
For all rows i
{
  Store first pixel in first element of original frame W₀(i, 0) and compute
all low frequency values of HWT and store them in frames W₀(i, j)
}
For all columns j of each frame W₀(i, j)
{
  store first pixel in first element of frame W(0, j) and compute all low
frequency values of HWT and store them in frames W(i, j)
}
Pass each frame W(i, j) to the video codec
```

B. Post-Processing

The pseudocode that follows represents an example of application of a mathematical way of post-processing video.
Receive decompressed frame W(i, j) from video codec. Generate intermediate frames $W_x$(i, j) from consecutive W(i, j) frames if required for desired frame-rate

```
For all rows i of frame Wₓ(i, j)
{
  Copy the first row to F₀(0, j) = Wₓ(0, j)
  For all columns j
  {
    Compute the next row F₀(1, j) = 2*Wₓ(1, j) − F₀(0, j)
  }
  For all columns j
  {
    Compute the next row F₀(2, j) = (2*Wₓ(2, j) +F₀(1, j))/3
  }
  For all columns j
  {
    Compute the next row F₀(3, j) = 2*Wₓ(2, j) − F₀(2, j)
  }
  For all columns j
  {
    Compute subsequent rows similarly
  }
}
Copy the first column of F₀(i,j) to F(i,0)
F(i,0) = F₀(i,0)
For all rows i of F₀(i,j)
{
  Compute the next columns
  F(i, 1) = 2F₀(i,1) − F(i,0);
    F(i, 2) = (2F₀(i,2) + F(i,1))/3;
    F(i, 3) = 2F₀(i,2) − F(i,2);
    for all columns j > 3
    {
      Compute subsequent columns similarly
    }
}
  Display frame F(i, j) on TV set.
```

Levels of Transformation and Compression Range

By increasing the levels of pre-processing and post-processing by one more levels, the compression ratio can be doubled with every increase in the number of levels. For example, with 2 levels, the compression for HD 1080p comes down to 0.5 Mbps and to less than 1 Mbps for 4K UHD. The video quality suffers no perceptible loss.

Implementing Efficiency

All the new of video compression results presented herein were obtained with parallelized digital computational structures using 64 bits/pixel corresponding to 16 bits/word (color component). This is why the post-processed video quality is so high resulting from the precision of the calculations.

Applications to 4K and 8K UHD Video

There is currently a lack of 4K and 8K content because of computational and storage requirements. However, the present descriptions can generate such content with the proper quality by considering the described post-processing methods for 4K, for example. We have seen that, in the final post-processing step, we start with HD 1080p of size 1920×1080 frames that are considered to be the low frequency components of the Haar WT of the 4K frames of size 3840×2160. The methods disclosed herein precisely calculated the 4K pixels from their low frequency Haar WT.

Similarly, 8K UHD content can be obtained from HD content by having one more IWT processing level to go from 4K to 8K great precision.

And, of course, such content can be easily compressed, transmitted, stored and displayed by the available monitor and TV screen hardware using the pre-processing and post-processing methods presented herein. In other words, 4K UHD video requires 1.5 Mbps and 8K UHD video requires 1.75 Mbps, compared to the numbers discussed in Denmark video Conference at the end of 2013 and in the Las Vegas Consumer Electronic Show of January 2014. Such predictions indicated that 4K UHD would require 15 Mbps when it is extensively used in several years.

Rationale for Mathematically Precise Increases of any Image Resolution

The methods presented herein provide techniques for computing the Inverse Haar Wavelet Transform from its Low Frequency components and can lead to the computation of an image of higher resolution than a given image, which can be considered to be the Low Frequency component of the calculated higher resolution image. Thus, starting with a 1080p image, for example, one can calculate precisely the 4K resolution image whose Low Frequency component is the given 1080p image. Similarly, one can calculate precisely an 8K resolution image whose Low Frequency component is the 4K resolution image. Similarly, one can calculate precisely a 16K resolution, ad 32K resolution or any higher level. This is precisely what happens with any given image when calculating the multilevel Direct and Inverse Wavelet Transforms.

These descriptions provide a much better video compression of the required high quality video right in 2014 with the corresponding cost savings and superior video quality.

EXAMPLES

The following examples illustrate certain aspects of the invention and are not intended to limit its scope. Rather, persons of ordinary skill in the art can use the disclosures and teachings herein to produce variations, all of which are considered part of this invention. Persons of skill can use the teachings and disclosures herein to create video images using the same functions and ways, or by making insubstantial changes, to produce similar or identical results. All of these are considered to be part of this invention.

Example 1: Performance Data

The methods based on calculating the exact values of the frames pixels using mathematics of the Haar Wavelet Transform were extensively tested using the H264 and H265 video codecs combined with the presented pre- and post-processing steps. H265 provides some improvement in compression ratio over H264, but it is much more complicated and cannot be used for real time performance with typical portable devices, and besides the methods previously discussed using the H264 codec give much better compression than H265 by itself.

Consequently, the performance values given in Table 2 below were obtained using the H264 video codec with the pre-processing and post-processing algorithms discussed above.

TABLE 2

Performance Values of the Disclosed Process

| Video | HD 1080p Bitrate | 4K UHD Bitrate |
|---|---|---|
| Movies | 1 Mbps | 1.5 Mbps |
| Nature | 1 Mbps | 1.5 Mbps |
| Sports | 1.1 Mbps | 1.75 Mbps |

In terms of PSNR values, the following Table 3 shows the comparisons in typical decibels (db) values between the codec alone and the codec with the methods disclosed herein for different video types reconstructed frames for each of the above bit rates.

TABLE 3

PSNR Values for Codec Alone and Codec Plus with Disclosed Process

| Video | H264 PSNR Codec alone | H264 + pre and post-processing PSNR |
|---|---|---|
| Movies | 81.29 | 128.12 db |
| Nature | 76.82 | 124.96 db |
| Sports | 72.67 | 119.67 db |

Example 2: Devices Incorporating the Software Implemented Methods Pre-Processing and Post-Processing Devices The methods disclosed herein can be implemented in many computerized devices. Computerized processing steps can be implemented in a Pre-Processor, which carries out decimation and Haar Wavelet-based compression. Such devices can be made and provided as separate, stand-alone components of a computer system, and can be added to existing computer, mobile device, television, cable box, set-top box, or similar such devices.

Additionally, methods disclosed herein can be implemented as a Post-Processor, which decompresses the output from the codec. Such Post-Processors can be appended to existing computer, television, mobile device, cable box, set-top box, or similar devices.

This invention includes integrated devices for pre-processing and post-processing of frames according to methods disclosed herein. A pre-processing device contains a memory area containing instructions for pre-processing, and a processor for carrying out instructions contained in the memory area. Such combined memory and pre-processing devices may be integrated circuits that can be manufactured separately and then incorporated into video systems. Connection of pre-processing device into a video system can include an input, where a frame from an image capture device (e.g., camera) can be input into the pre-processing device. Output of the pre-processing device can be connected to a codec. Optionally, a buffer area may be included in pre-processing device.

Similarly, a post-processing device can contain a memory area containing instructions for post-processing according to methods of this invention, and also includes a processor for carrying out instructions contained in the memory area. Such combined memory and post-processing devices may be integrated circuits that can be manufactured separately and then incorporated into video systems. Connection of a post-processing device into a video system permits a decompressed frame from a codec to be input into a post-processing device. For display purposes, a post-processing device can be attached to an output device, such as a video monitor, mobile device screen, or a television for example. A buffer area may be included in a post-processing device.

Example 3: Color Imaging

With respect to images and video frames, the method is applied first to columns and then to rows. Also, for color images, the method can be applied separately to the luminance (Y) and the chrominance (UV) components.

Example 4: Computer-Readable Media

A computer readable medium contains a memory area, which contains instructions for frame pre-processing according to methods of this invention. Physical devices include a diskette, flash memory, tape drive, or other physical hardware component. Instructions contained on such a device can be transferred to an external pre-processor for execution of the instructions contained in the memory area.

Another device contains a memory area, which contains instructions for frame post-processing according to methods of this invention. Physical devices include a diskette, flash memory, tape drive, or other physical hardware component. Instructions contained on such a device can be transferred to an external post-processor for execution of the instructions contained in the memory area.

In other embodiments, programming instructions for pre-processing, post-processing and display can be transmitted using wireless, cable, fiber optic, or other media.

It can be appreciated that Pre-Processing, codec, and Post-processing methods can be integrated together to provide a system, which can be incorporated into a computer, mobile device, television, cable box, or similar devices.

Example 5: Implementation in Massively Parallel Modern Heterogeneous Computing Architectures Today, even handheld mobile devices comprise multicore platforms using parallel computing frameworks. A prototype of an computer implementation of the computations can be developed using OpenCL Programming (Ref 5; OpenCL Programming by Example by R. Banger and K. Bhattacharyya, 2013 Packt Publishing Ltd., UK, incorporated herein fully by reference) and the CUDA language (Ref. 6; CUDA Programming by Shane Cook, 2013 Elsevier, Inc., incorporated herein fully by reference) for the NVIDIA Graphics Card in order to demonstrate an efficient and fast (60 fps) processing for real-time display 4K UHD video on inexpensive 4K TV sets.

Thus, low cost implementation is another critical advantage of the technology in addition to minimal storage and transmission costs and the high perceived video quality.

Such massively parallel implementation is the result of the intrinsic nature of the methods can be ported to multiple devices that don't have to have the same architecture or even the same vendor.

In summary, this technology can make 4K and 8K UHD video communications accessible and affordable earlier than predicted.

INDUSTRIAL APPLICABILITY

Systems and methods of this invention can be used in the telecommunications and video industries to permit high-quality video to be stored, transmitted and replayed at reduced cost and with reduced requirements for computer storage capacity. The implications of aspects of this invention for the reduction of the current staggering costs of video storage and transmission are significant.

REFERENCES

The contents of each of the references and documents listed above and below in this application are herein incorporated fully by reference in their entirety.

1. Ten Lectures on Wavelets by Ingrid Daubechies, Society for Industrial and Applied Mathematics.
2. A New Wavelet Transform Video Compression Algorithm, IEEE 3$^{rd}$ International Conference on Communications Software Networks, 2011, Zhange Shu.
3. Three Dimensional Wavelet Transform Video Compression, 1999 IEEE International Conference on Multimedia Computing and Systems, July 1999, L. K. Levy.
4. A New and Novel Image Compression Algorithm using Wavelet Footprints, Academic Journal 2005, Vol. 14, part 6, page 17, N. Malmurugan, A. Shamugan, S. Jayaraman, V. V. Dinesh, Chader.
5. OpenCL Programming by Example by R. Banger and K. Bhattacharyya, 2013 Packt Publishing Ltd., UK.
6. CUDA Programming by Shane Cook, 2013 Elsevier, Inc.

What is claimed is:

1. A method for producing a video image of an object, comprising the steps:
   a. providing a digitized image frame of said object and storing said digitized image frame in a memory device of a computer processor;
   b. providing a decimated Haar wavelet transform (WT) of said digitized image frame;
   c. discarding high-frequency components of said decimated WT thereby producing a pre-processed frame according to the following steps:
      i. for all rows i, store a first pixel in a first element of original frame $W_0(i, 0)$ and compute all low frequency values of HWT and store them in frames $W_0(i, j)$; and
      ii. for all columns j of each frame $W_0(i, j)$, store a first pixel in a first element of frame $W(0, j)$ and compute all low frequency values of HWT and store them in frames $W(i, j)$;
   d. pass each frame $W(i, j)$ to the video codec;
   e. compress said pre-processed frame using a video codec thereby producing a compressed video frame;
   f. decompress said compressed video frame using said codec; and
   g. recreate a full sized image of said frame using post-processing using low-frequency parts of the WT and the first pixel of every row and column of the original image before the WT by carrying out the following steps:
      i. for all rows i of frame $W_x(i, j)$, copy the first row to $F_0(0, j)=W_x(0, j)$;
      ii. for all columns j, compute the next row $F_0(1,j)=2*W_x(1, j)-F_0(0, j)$;
      iii. for all columns j, compute the next row $F_0(2, j)=(2*W_x(2, j)+F_0(1, j))/3$;
      iv. for all columns j, compute the next row $F_0(3, j)=2*W_x(2, j)-F_0(2, j)$;
      v. for all columns j, compute subsequent rows similarly;
      vi. copy the first column of $F_0(i,j)$ to $F(i,0)$, $F(i,0)=F_0(i,0)$
      vii. for all rows i of $F_0(i\ j)$, compute the next columns $F(i,1)=2F_0(i,1)-F(i,0)$;

$F(i,2)=2F_0(i,2)+F(i,1))/3$;

$F(i,3)=2F_0(i,2)-F(i,2)$;

viii. for all columns j>3, compute subsequent columns similarly; and
   h. display frame $F(i, j)$.

2. The method of claim 1, comprising a single level frame size reduction.

3. The method of claim 2, further comprising a second level of frame size reduction.

4. The method of claim 3, further comprising a third level of frame size reduction.

5. The method of claim 1, comprising a single level frame size expansion.

6. The method of claim 5, further comprising a second level frame size expansion.

7. The method of claim 6, further comprising a third level frame size expansion.

* * * * *